United States Patent
Shin et al.

(10) Patent No.: US 9,811,318 B2
(45) Date of Patent: Nov. 7, 2017

(54) MONTGOMERY MULTIPLICATION METHOD FOR PERFORMING FINAL MODULAR REDUCTION WITHOUT COMPARISON OPERATION AND MONTGOMERY MULTIPLIER

(71) Applicant: SAMSUNG ELECTRONICS CO., LTD., Suwon-si, Gyeonggi-Do (KR)

(72) Inventors: Jonghoon Shin, Hwaseong-si (KR); Sun-Soo Shin, Seoul (KR); Kyoungmoon Ahn, Seoul (KR); Yong Ki Lee, Yongin-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 195 days.

(21) Appl. No.: 14/672,656

(22) Filed: Mar. 30, 2015

(65) Prior Publication Data

US 2015/0277855 A1  Oct. 1, 2015

(30) Foreign Application Priority Data

Mar. 31, 2014 (KR) ........................ 10-2014-0037898

(51) Int. Cl.
G06F 7/72 (2006.01)
G06F 7/533 (2006.01)

(52) U.S. Cl.
CPC ............ G06F 7/728 (2013.01); G06F 7/5338 (2013.01)

(58) Field of Classification Search
None
See application file for complete search history.

(56) References Cited

U.S. PATENT DOCUMENTS

| 7,035,889 B1 | 4/2006 | Carlson et al. |
| 7,080,109 B2 | 7/2006 | Koc et al. |
| 7,480,691 B2 | 1/2009 | Okumura |
| 7,519,643 B2 | 4/2009 | Har et al. |
| 7,519,644 B2* | 4/2009 | Al-Khoraidly ......... G06F 7/724 708/492 |
| 7,805,478 B2* | 9/2010 | Son .......................... G06F 7/728 708/491 |

(Continued)

FOREIGN PATENT DOCUMENTS

| JP | 2004-227248 | 8/2004 |
| JP | 2004-258141 | 9/2004 |

(Continued)

*Primary Examiner* — David H Malzahn
(74) *Attorney, Agent, or Firm* — F. Chau & Associates, LLC

(57) ABSTRACT

A Montgomery multiplier includes a partial product computing unit for multiplying a multiplicand and a multiplier; a modulus reduction computing unit for performing a multiplication of a modulus and a quotient that reflects a quotient sign; an accumulation unit for accumulating in a intermediate value an output value of the partial product computing unit and an output value of the modulus reduction computing unit from a previous cycle; a quotient computing unit for receiving an accumulation value of the accumulation unit during a current cycle and calculating a quotient sign to be used during a next cycle; and a quotient sign determination unit for determining a quotient sign to be used during a next cycle from the multiplicand, the multiplier and the quotient.

17 Claims, 4 Drawing Sheets

(56) References Cited

U.S. PATENT DOCUMENTS

| | | |
|---|---|---|
| 7,805,479 B2 | 9/2010 | Moshier et al. |
| 7,904,498 B2 | 3/2011 | Yoshino et al. |
| 8,433,736 B2 | 4/2013 | Huang et al. |
| 8,527,570 B1 | 9/2013 | Shu et al. |
| 8,756,268 B2 | 6/2014 | Ahn et al. |
| 8,781,112 B2 | 7/2014 | Lambert |
| 8,793,300 B2 | 7/2014 | Niel |
| 2002/0059353 A1 | 5/2002 | Koc et al. |
| 2004/0167952 A1 | 8/2004 | Gueron et al. |
| 2004/0252829 A1 | 12/2004 | Son |
| 2006/0023878 A1 | 2/2006 | Son |
| 2008/0065713 A1* | 3/2008 | Lee .................. G06F 7/728 708/491 |
| 2009/0089350 A1 | 4/2009 | Sauzet et al. |
| 2010/0146029 A1 | 6/2010 | Higashi |
| 2012/0265797 A1 | 10/2012 | Niel |
| 2012/0317159 A1 | 12/2012 | Ahn et al. |
| 2013/0096062 A1 | 4/2013 | Hedrich et al. |
| 2013/0311533 A1 | 11/2013 | Lee et al. |
| 2015/0277855 A1* | 10/2015 | Shin .................. G06F 7/728 708/620 |

FOREIGN PATENT DOCUMENTS

| | | |
|---|---|---|
| JP | 2004-273169 | 9/2004 |
| JP | 2005-031472 | 2/2005 |
| JP | 2006-091086 | 4/2006 |
| KR | 2002-0049659 | 6/2002 |
| KR | 2006-0027896 | 3/2006 |
| KR | 2010-0063623 | 6/2010 |
| KR | 2010-0098017 | 9/2010 |

\* cited by examiner

MONTGOMERY MULTIPLICATION METHOD FOR PERFORMING FINAL MODULAR REDUCTION WITHOUT COMPARISON OPERATION AND MONTGOMERY MULTIPLIER

CROSS-REFERENCE TO RELATED APPLICATIONS

This U.S. non-provisional patent application claims priority under 35 U.S.C. §119 from Korean Patent Application No. 10-2014-0037898, filed on Mar. 31, 2014 in the Korean Intellectual Office, and all the benefits accruing therefrom, the contents of which are herein incorporated by reference in their entirety.

BACKGROUND

The present inventive concept is directed to a Montgomery multiplier and a Montgomery multiplication method.

Modular operations provide the underpinning for some of the most widely used public key cryptographic algorithms, such as RSA (Rivest Shamir Adelman) and ECC (elliptic curve cryptography). The basic modular operations include modular addition/subtraction and modular multiplication. Modular division is not used in most algorithms because of its high computational complexity. If necessary, a modular division can be performed using modular multiplication. Modular multiplication can be performed by a set of modular additions. In this case, modular multiplication corresponds to a serialized multiplication and its computation speed is very low. Thus, to improve its performance, modular multiplication is generally performed in the form of a digit-serialized multiplication by increasing a radix.

The operations typically performed by a public key operator include modular addition/subtraction and a modular multiplication. Since modular multiplication is more complicated and has a longer critical path than modular addition/subtraction, the maximum operating frequency of an overall security operator may depend on how modular multiplication is implemented and used.

Modular multiplication includes two operations: a multiplication and a reduction. A modular multiplication algorithm that is widely used in hardware design is the Montgomery multiplication algorithm. The Montgomery multiplication algorithm can effectively perform a reduction operation.

SUMMARY

Embodiments of the inventive concept provide a Montgomery multiplier apparatus. The Montgomery multiplier may include a partial product computing unit for multiplying a multiplicand and a multiplier; a modulus reduction computing unit for multiplying a modulus and a quotient with a quotient sign; an accumulation unit for accumulating in a intermediate value an output value of the partial product computing unit and an output value of the modulus reduction computing unit from a previous cycle; a quotient computing unit for receiving an accumulation value of the accumulation unit during a current cycle and for calculating a quotient sign to be used during a next cycle; and a quotient sign determination unit for determining a quotient sign to be used during a next cycle from the multiplicand, the multiplier and the quotient.

Embodiments of the inventive concept also provide a method of multiplying a Montgomery multiplier. The multiplying method may include calculating a partial product of a multiplier and a multiplicand during a current cycle; determining a quotient sign of a quotient calculated during a previous cycle; calculating a modulus reduction based on the determined quotient sign; and accumulating in a intermediate value the partial product and the modulus reduction from a previous cycle.

Embodiments of the inventive concept also provide a Montgomery multiplier apparatus. The Montgomery multiplier may include a modulus reduction computing unit for multiplying a modulus and a quotient with a quotient sign; an accumulation unit for accumulating in a intermediate value a product of a multiplicand and a multiplier and an output value of the modulus reduction computing unit from a previous cycle; a quotient computing unit for receiving an accumulation value of the accumulation unit during a current cycle and for calculating a quotient sign to be used during a next cycle; and a quotient sign determination unit for determining the quotient sign to be used during a next cycle from a quotient being calculated during each cycle from the multiplicand, the multiplier and the quotient.

DETAILED DESCRIPTION OF EXEMPLARY EMBODIMENTS

Figure 1:
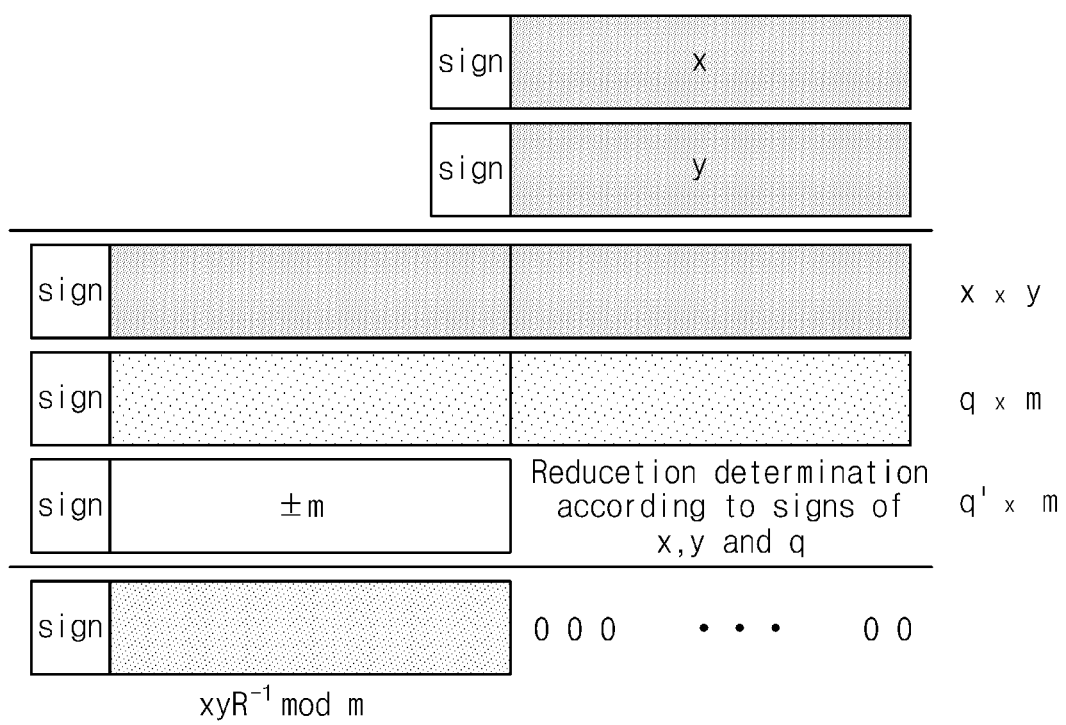
FIG. 1 illustrates the concept of a Montgomery multiplier in accordance with some embodiments of the inventive concept.

Exemplary embodiments of inventive concept will be described more fully hereinafter with reference to the accompanying drawings, in which exemplary embodiments of the inventive concept are shown. This inventive concept may, however, be embodied in many different forms and should not be construed as limited to the embodiments set forth herein. In the drawings, the size and relative sizes of layers and regions may be exaggerated for clarity. Like numbers may refer to like elements throughout.

A Montgomery multiplication algorithm for a multiplication operation in accordance with some embodiments of the inventive concept may include a final reduction, which is an operation of reducing an output range from (−2m, 2m) to (−m, m). Thus, it is not necessary to compare an output value with a modulus size. That is, an operation cycle for a final reduction operation and its related logic are not necessary.

The table below shows a general Montgomery multiplication algorithm.

| Algorithm Montgomery multiplication |
| --- |
| INPUT: integers $m = (m_{n-1}...m_1m_0)_b$, $x = (x_{n-1}...x_1x_0)_b$, $y = (y_{n-1}...y_1y_0)_b$ with $-m \leq x$, $y < m$, $R = b^n$ with $\gcd(m,b) = 1$, and $m' = -m^{-1} \bmod b$ |
| OUTPUT: $xyR^{-1} \bmod m$ |
| 1.      $A \leftarrow 0$. (Notation: $A = (a_n a_{n-1}...a_1 a_0)_b$) |
| 2.      For i from 0 to (n−1) do the following: |
|     2.1     $q_i \leftarrow (a_0 + x_i y_0) m' \bmod b$ |
|     2.2     $A \leftarrow (A + x_i y + q_i m)/b$ |
| 3.      If $A \geq m$ then $A \leftarrow A - m$ |
| 4.      Return (A) |

The input of a Montgomery multiplication includes a modulus (m), a multiplicand (x) and a multiplier (y). The modulus (m), the multiplicand (x) and the multiplier (y) are input as a radix-based digit value. In the case of the Montgomery multiplication algorithm disclosed above, the multiplicand (x) and the multiplier (y) have values in the range of (0, m). A Montgomery constant R is radix (b) raised to the nth power. The exponent n is an integer greater than 2. The modulus (m) and the radix (b) are relatively prime.

The output of the Montgomery multiplication is $xyR^{-1} \bmod m$.

After executing Step 2 of the Montgomery algorithm disclosed above, an intermediate value A has a value in the range of [0, 2 m). Thus, Step 3 is performed to reduce the intermediate value A for the next operation. However, executing Step 3 may need complicated hardware for the logic that compares A with m, and many operating cycles, since a cycle is needed to read A and m from an internal memory, to store A and m in the memory, to compare A and m, and to subtract m from A. Implementing a Montgomery multiplier with a multi-precision may further increase the cost and reduce performance. Since the reduction operation (A-m) is selectively executed depending on the intermediate value A, it may be vulnerable to a side channel attack.

When implementing a Montgomery multiplier in hardware, a partial product $(x_i y, q_i m)$ of a Step 2.2 can use a booth recoding. Since the type of x, or q, of the partial product $(x_i y, q_i m)$ changes from $\{0, 1, 2, 3\}$ to $\{-2, -1, 0, 1, 2\}$, the booth recoding does not need to implement an operation with respect to 3. Thus, a hardware cost can be reduced.

In this case, the algorithm may be modified as follows. For convenience of description, it is assumed that n is an even number. A negative number is expressed by 2's complement. A high rank bit including $a_n$ is a sign padding. A table below illustrates a Montgomery multiplication algorithm using a booth recoding.

| Algorithm Montgomery multiplication (booth recoding) |
| --- |
| INPUT: integers $m = (m_{n-1}...m_1m_0)_b$, $x = (x_{n-1}...x_1x_0)_b$, $y = (y_{n-1}...y_1y_0)_b$ with $-m \leq x$, $y < m$, $R = b^n$ with $\gcd(m,b) = 1$, and $m' = -m^{-1} \bmod b$ |
| OUTPUT: $xyR^{-1} \bmod m$ |
| 1.      $A \leftarrow 0$. (Notation: $A = (a_n a_{n-1}...a_1 a_0)_b$) |
| 2.      For i from 0 to n step 2 do the following: |
|     2.1     $B\_x_i = \text{booth\_recoding}(x_{i+1} x_i x_{i-1})$, where $x_{-1} = 0$ |
|     2.2     $q_i \leftarrow (a_0 + B\_x_i y_0) m' \bmod b^2$ |
|     2.3     $B\_q_i \leftarrow \text{booth\_recoding}(q_i)$ |
|     2.4     $A \leftarrow (A + B\_x_i y + B\_q_i m)/b^2$ |
| 3.      If $A \leq -m$ then $A \leftarrow A + m$ |
|         else if $A \geq m$ then $A \leftarrow A - m$ |
| 4.      Return (A) |

If a booth recoding is used to reduce the hardware cost, an additional operation for processing a signed number may be needed, which is the step when i=n.

The reason a final reduction operation is needed in the above-described Montgomery multiplication algorithm will be described below. For convenience of description, it is assumed that a radix (b) is 2. Letting an input be x y, and m, a Montgomery multiplication operation satisfies the following equality.

$$\text{Montgomery multiplication}(x,y,m) = (xy + qm)/2^n$$

Let n be a bit-length of x, y, and m. If x and y satisfy $-m < x < m$, and $-m < y < m$ respectively, xy satisfies $-m^2 < xy < m^2$.

If using a booth recoding, a quotient $(q_i)$ is one of $\{-2, -1, 0, 1, 2\}$. Thus, the maximum value and minimum value of qm satisfy the following inequality.

$$-2m^2/3 < qm < 2m^2/3$$

Thus, since xy+qm satisfies $-2 m^2 < -5 m^2/3 < xy+qm < 5 m^2/3 < 2 m^2$, $m < 2^n$, $xy+qm/2^n$ satisfies $-2m < (xy+qm)/2^n < 2m$. That is, a value of a Montgomery multiplication is in the range of (−2m, 2m) before executing a final reduction operation. Consequently, the Montgomery multiplication algorithm needs to perform the final reduction operation. This can be expressed by the following mathematical expression.

$$(xy+qm)/2^n + q'm$$

FIG. 1 illustrates the concept of a Montgomery multiplier in accordance with some embodiments of the inventive concept. FIG. 1 schematically depicts the multiplicand (x) and the multiplier (y) with their respective sign bits, the products xy and qm and their respective sign bits, the q'm term with its sign bit, and the final product $xyR^{-1} \bmod m$ and its sign bit. Referring to FIG. 1, whether or not a reduction is executed (q') can be determined depending on the signs (x, y, q). A size of xy+qm can be classified according to operand signs (x, y, q) based on the table below.

| xy | m (always) | q | s = xy + qm | Reduction | q' |
| --- | --- | --- | --- | --- | --- |
| + | + | + | 0 < s < 2m | Necessary (−m) | −1 |
| + | + | − | −m < s < m | Non-necessary | 0 |
| − | + | + | −m < s < m | Non-necessary | 0 |
| − | + | − | −2m < s < 0 | Necessary(+m) | 1 |
| Don't care | + | 0 | −m < s < m | Non-necessary | 0 |

Since the signs (x, y), which are inputs to a Montgomery multiplication, are already known, if a sign of the reduction quotient (q) can be calculated in advance, a final reduction operation can be performed without comparing the intermediate value A with a size of a modulus (m). A reduction coefficient that is used in the final reduction is q'. Whether or not a reduction operation should be performed can be determined depending on operand signs (x, y, q).

A table below shows a Montgomery multiplication algorithm in accordance with some embodiments of inventive concept using those characteristics.

| Algorithm Proposed Montgomery multiplication |
| --- |
| INPUT: integers $m = (m_{n-1}...m_1m_0)_b$, $x = (x_{n-1}...x_1x_0)_b$, $y = (y_{n-1}...y_1y_0)_b$ with $-m \leq x$, $y < m$, $R = b^n$ with $\gcd(m,b) = 1$, and $m' = -m^{-1} \bmod b$ |
| OUTPUT: $xyR^{-1} \bmod m$ |
| 1.      $q\_\text{sign} \leftarrow 0$ $A \leftarrow 0$ (Notation: $A = (a_n a_{n-1}...a_1 a_0)_b$) |
| 2.      For i from 0 to n−2 step 2 do the following: |
|     2.1     $B\_x_i = \text{booth\_recoding}(x_{i+1} x_i x_{i-1})$, where $x_{-1} = 0$ |
|     2.2     $q_i \leftarrow (a_0 + B\_x_i y_0) m' \bmod b^2$ |

-continued

| | Algorithm Proposed Montgomery multiplication |
|---|---|
| 2.3 | $B\_q_i \leftarrow$ booth_recoding $(q_i)$ |
| 2.4 | update q_sign |
| 2.5 | $A \leftarrow (A + B\_x_iy + B\_q_im)/b^2$ |
| 3. | $A \leftarrow A + q\_sign*m$ |
| 4. | Return (A) |

Unlike a Montgomery multiplication algorithm described above, inputs (x, y) have values in the range [−m, m). The output ($xyR^{-1}$ mod m) of the Montgomery multiplication becomes A+q_sign×m.

The q_sign can be calculated by tracking a value of $q_i$. This is because the quotient (q) satisfies the following mathematical formula.

$$q = q_{n-2}2^{n-2} + q_{n-4}2^{n-4} + \ldots + q_2 2^2 + q_0 2^0$$

Referring to the mathematical formula, if the highest rank bit $q_{n-2}$ is 0, the next highest rank bit $q_{n-4}$ determines an overall sign.

A Montgomery multiplication algorithm in accordance with some embodiments of the inventive concept does not need to perform an additional reduction operation to process a sign part. In Step 3, there is no need to compare a modulus (m) with an intermediate value A to perform the reduction operation. In addition, the reduction part of Step 3 may be included in Step 2. Thus, when implementing in hardware, logic is not needed to compare A with the modulus (m). An overall operation performance can be improved by including a reduction in Step 2.

A Montgomery multiplication algorithm in accordance with some embodiments of the inventive concept has the following properties. First, there is no need to compare the intermediate value A with a size of the modulus (m). Second, size comparison logic is not needed. Third, an operation cycle for a size comparison is not needed. Fourth, of the number of operation cycles for a multi-precision operation may be reduced. Since a size comparison operation is not needed, the final reduction (step 3) can be merged into a step 2.5.

Figure 2:
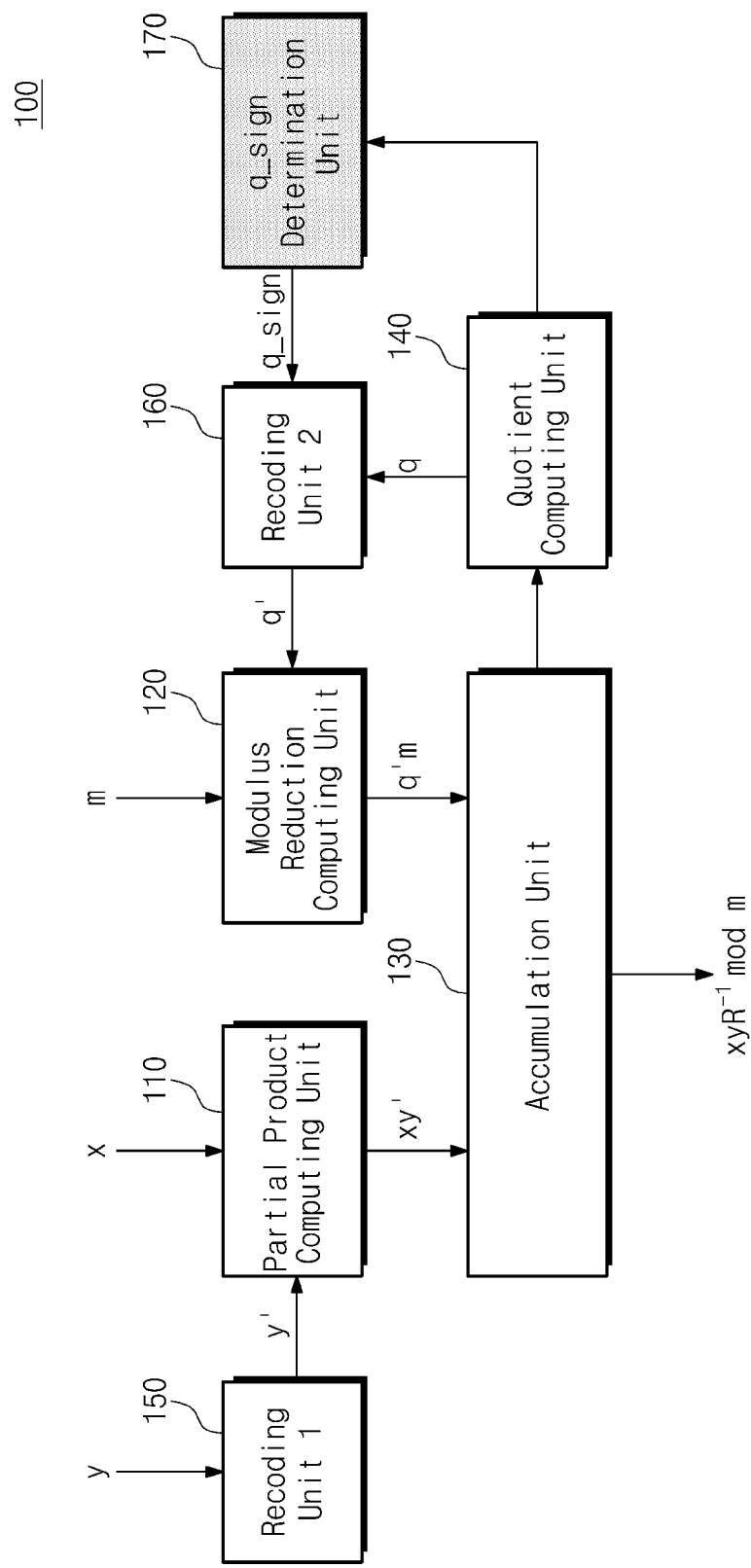
FIG. 2 is a block diagram of a Montgomery multiplier in accordance with some embodiments of the inventive concept.

FIG. 2 is a block diagram of a Montgomery multiplier in accordance with some embodiments of the inventive concept. Referring to FIG. 2, the Montgomery multiplier 100 includes a partial product computing unit 110, a modulus reduction computing unit 120, an accumulation unit 130, a quotient computing unit 140, first and second recoding units 150 and 160 and a quotient sign determination unit 170.

The partial product computing unit 110 performs a multiplication operation on a multiplicand (x') and a multiplier (y') during a current cycle. The multiplier (y') may be a booth-recoding of the multiplier (y). The modulus reduction computing unit 120 performs a multiplication operation on a modulus (m) and a quotient (q') that reflects a quotient sign (q_sign). The quotient (q') may be a booth-recoding of the quotient (q). The accumulation unit 130 accumulates in an intermediate value the output value (xy') of the partial product computing unit 110 and the output value (q'm) of the modulus product computing unit 120 from a previous cycle. The quotient computing unit 140 calculates a quotient (q) to be used during a next cycle from an accumulation value (xy'+q'm) of the accumulation unit 130. The first recoding unit 150 is provided with a multiplier (y) to output a booth-recoded value (y') of the multiplier (y). The second recoding unit 160 is provided with a quotient (q) and a quotient sign (q_sign) to output a booth-recoded value (q') of the quotient (q) and the quotient sign (q_sign). The quotient sign determination unit 170 determines a quotient sign (q_sign) by tracking a quotient ($q_i$) during every cycle.

In addition, registers for storing the multiplicand (x), the multiplier (y), and the modulus (m) may be further included. The accumulation unit 130 outputs $xyR^{-1}$ mod m as a final value of the Montgomery multiplication.

By including a final reduction of an output range from (−2m, 2m) to (−m, m) in the multiplication operation, the Montgomery multiplier 100 does not need to compare an output value with a modulus (m). Thus, the Montgomery multiplier 100 does not need the related logic and operation cycle for a final reduction operation. That is, a Montgomery multiplier according to embodiments of the inventive concept may have a reduced hardware cost and an improved performance as compared with a conventional Montgomery multiplier.

In FIG. 2, the Montgomery multiplier 100 uses a booth recoding. However, embodiments of the inventive concept are not limited thereto. An alternative Montgomery multiplier may not use a booth recoding.

Figure 3:
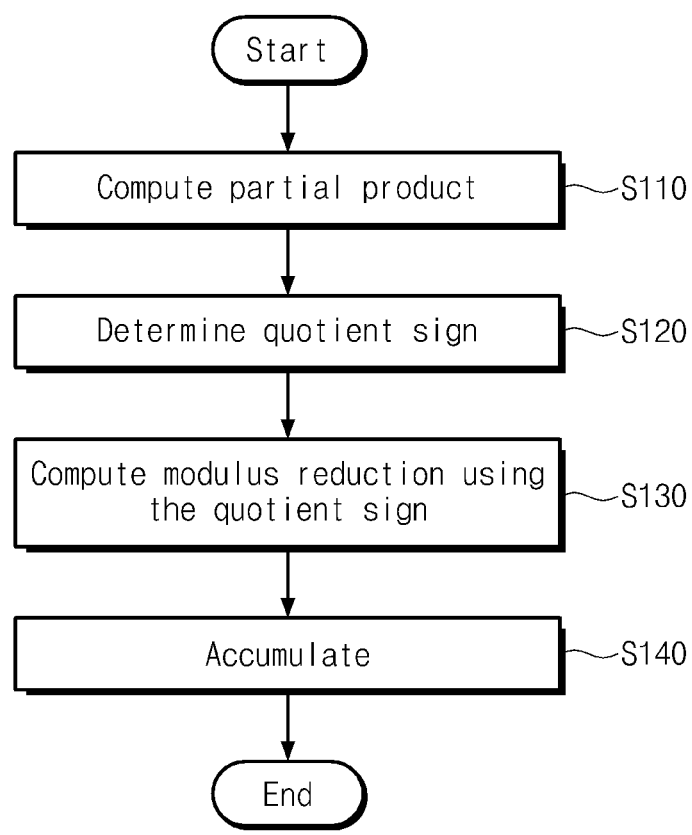
FIG. 3 is a flow chart of a method of a Montgomery multiplier in accordance with some embodiments of the inventive concept.

FIG. 3 is a flow chart of a method of a Montgomery multiplier in accordance with some embodiments of the inventive concept. Referring to FIGS. 1 through 3, a Montgomery multiplication operation is as follows.

A partial product is calculated with respect to a multiplicand (x) and a multiplier (y) during a current cycle, such as an i-th Montgomery multiplication operation (S110). A quotient sign (q_sign) with respect to a quotient (q) calculated from an intermediate value (A) determined during a previous (i−1)th Montgomery multiplication operation cycle (S120). The quotient sign (q_sign) can be determined by tracking a quotient at every cycle. A modulus reduction using the quotient sign (q_sign) is calculated (S130). The partial product and the modulus reduction are accumulated in the intermediate value (A) from the previous cycle (S140).

A Montgomery multiplication operation in accordance with some embodiments of the inventive concept does not need a final reduction operation because a modulus reduction operation is performed using the quotient sign (q_sign).

Figure 4:
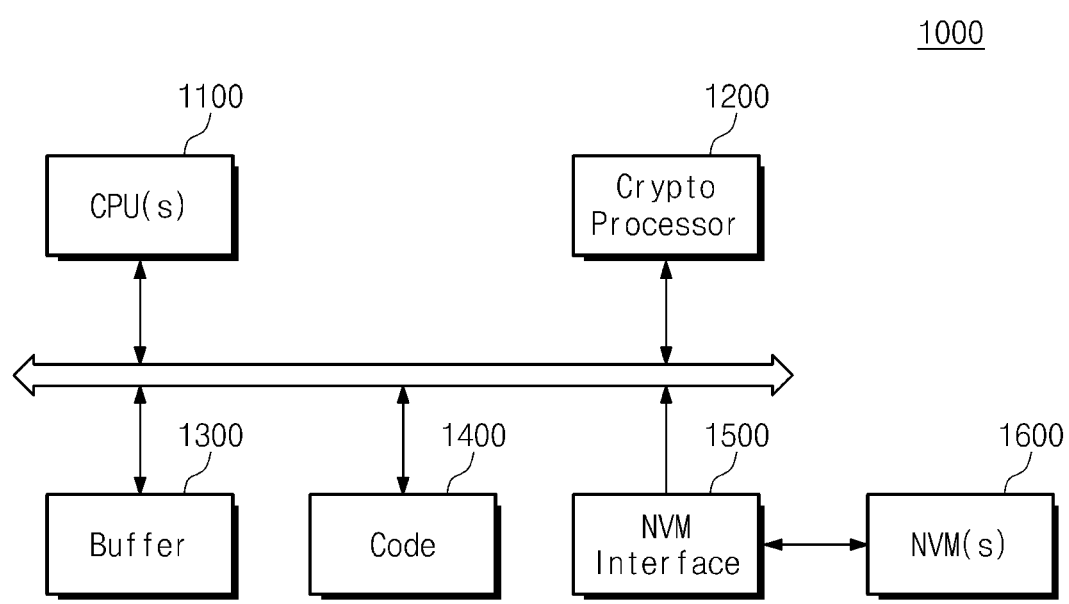
FIG. 4 is a block diagram of a security system that includes a crypto processor having a modular multiplier in accordance with some embodiments of the inventive concept.

FIG. 4 is a block diagram of a security system 1000 that includes a crypto processor having a modular multiplier in accordance with some embodiments of the inventive concept. Referring to FIG. 4, the security system 1000 includes one or more central processing units (CPUs) 1100, a crypto processor 1200, a buffer memory 1300, a code memory 1400, a nonvolatile memory interface 1500 and at least one nonvolatile memory 1600.

The central processing unit 1100 controls an overall operation of the security system 1000. The crypto processor 1200 decodes a command to enable code certification and electronic signature and processes data under control of the central processing unit (CPU) 1100. The crypto processor 1200 includes at least one of the modular multipliers 100 illustrated in FIG. 2. The buffer memory 1300 can store data, such as input/output data or data used in a code processing process, needed to drive the security system 1000. The buffer memory 1300 can be embodied by a volatile memory device such as a DRAM, a SRAM, etc. The code memory 1400 stores code data needed to operate the security system 1000. The code memory 1400 used for encryption and an electronic signature can store a security module and a modulus for data that should be protected together with a key needed for encryption and the electronic signature. The code memory 1400 can be embodied by a nonvolatile memory device such as a ROM, a PRAM, etc. The nonvolatile memory interface 1500 provides an interface with at least one nonvolatile memory device 1600. The nonvolatile memory device 1600 stores user data.

Since the security system 1000 according to some embodiments of the inventive concept does not need a final step reduction operation as compared with a conventional security system, a hardware size and an operation cycle can be reduced. Thus, the security system 1000 can process data more rapidly.

A Montgomery multiplier and a multiplication operation thereof in accordance with some embodiments of inventive concept, by performing a modulus reduction operation reflecting a quotient sign, does not need to compare an output value with a size of a modulus, which can reduce a hardware cost and an operation cycle.

Although exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents. Therefore, the above-disclosed subject matter is to be considered illustrative, and not restrictive.

What is claimed is:

1. A Montgomery multiplier apparatus, comprising:
   a partial product computing unit configured to multiply a multiplicand and a multiplier;
   a modulus reduction computing unit configured to multiply a modulus and a quotient with a quotient sign, wherein the quotient is zero during a first cycle;
   an accumulation unit configured to accumulate in a intermediate value an output value of the partial product computing unit and an output value of the modulus reduction computing unit from a previous cycle;
   a quotient computing unit configured to receive an accumulation value of the accumulation unit during a current cycle and to calculate a quotient to be used during a next cycle; and
   a quotient sign determination unit configured to determine the quotient sign to be used during the next cycle from the multiplicand, the multiplier and the quotient.

2. The Montgomery multiplier of claim 1, wherein the multiplicand, the multiplier and the quotient are represented by radix-based bits.

3. The Montgomery multiplier of claim 1, further comprising a first booth recoding unit configured to booth recode the multiplier.

4. The Montgomery multiplier of claim 1, further comprising a second booth recoding unit configured to booth recode the quotient.

5. The Montgomery multiplier of claim 1, wherein the multiplicand and the multiplier are each an integer whose value is in a range -m to m, and wherein m is the modulus.

6. The Montgomery multiplier of claim 1, wherein the quotient sign determination unit determines the quotient sign by tracking a quotient being calculated during each cycle.

7. The Montgomery multiplier of claim 6, wherein the quotient sign for a next cycle is negative if the sign of the quotient and the sign of a product of the multiplicand and multiplier are both positive, the quotient sign is positive if the sign of the quotient and the sign of the product of the multiplicand and the multiplier are both negative, and the quotient sign is zero otherwise.

8. A Montgomery multiplier apparatus, comprising:
   a partial product computing unit configured to calculate a partial product of a multiplier and a multiplicand during a current cycle;
   a quotient sign determination unit configured to determine a quotient sign of a quotient calculated during a previous cycle, wherein the quotient is zero during a first cycle;
   a modulus reduction computing unit configured to calculate a modulus reduction by multiplying a modulus of the multiplier and multiplicand by the quotient based on the determined quotient sign;
   an accumulation unit configured to accumulate in a intermediate value the partial product and the modulus reduction from a previous cycle, and
   a quotient computing unit configured to calculate the quotient from the intermediate value, wherein the quotient is used during a next cycle.

9. The Montgomery multiplier apparatus of claim 8, further comprising a first booth recoding unit configured to booth-recode the multiplier.

10. The Montgomery multiplier apparatus of claim 8, further comprising a second booth recoding unit configured to booth-recode the calculated quotient.

11. The Montgomery multiplier apparatus of claim 8, wherein the quotient sign determination unit determines the quotient sign by tracking a quotient during every cycle.

12. The Montgomery multiplier apparatus of claim 11, wherein the quotient sign is determined by a sign of a most significant bit of the tracked quotient.

13. A Montgomery multiplier apparatus, comprising:
    a modulus reduction computing unit configured to multiply a modulus and a quotient with a quotient sign, wherein the quotient is zero during a first cycle;
    an accumulation unit configured to accumulate in a intermediate value a product of a multiplicand and a multiplier received from another unit and an output value of the modulus reduction computing unit from a previous cycle;
    a quotient computing unit configured to receive an accumulation value of the accumulation unit during a current cycle and to calculate a quotient sign to he used during a next cycle; and
    a quotient sign determination unit configured to determine the quotient sign to be used during a next cycle from a quotient being calculated during each cycle from the multiplicand, the multiplier and the quotient.

14. The Montgomery multiplier of claim 13, wherein the another unit is a partial product computing unit configured to multiply the multiplicand and the multiplier.

15. The Montgomery multiplier of claim 14, further comprising a first booth recoding unit configured to booth recode the multiplier, and a second booth recoding unit configured to booth recode the quotient.

16. The Montgomery multiplier of claim 13, wherein the quotient sign for the next cycle is negative if the sign of the quotient and the sign of the product of the multiplicand and the multiplier are both positive, the quotient sign is positive if the sign of the quotient and the sign of the product of the multiplicand and the multiplier are both negative, and the quotient sign is zero otherwise.

17. The Montgomery multiplier of claim 13, wherein the multiplicand, the multiplier and the quotient are each integers represented by radix-based bits, and the multiplicand and the multiplier each have a value in a range -m to m, and wherein m is the modulus.

* * * * *